(12) United States Patent
Naruse

(10) Patent No.: US 7,415,407 B2
(45) Date of Patent: Aug. 19, 2008

(54) INFORMATION TRANSMITTING SYSTEM, INFORMATION ENCODER AND INFORMATION DECODER

(75) Inventor: Tetsuya Naruse, Chiba (JP)

(73) Assignee: Sony Corporation (JP)

( * ) Notice: Subject to any disclaimer, the term of this patent is extended or adjusted under 35 U.S.C. 154(b) by 881 days.

(21) Appl. No.: 10/468,106

(22) PCT Filed: Nov. 15, 2002

(86) PCT No.: PCT/JP02/11969

§ 371 (c)(1),
(2), (4) Date: Aug. 15, 2003

(87) PCT Pub. No.: WO03/052743

PCT Pub. Date: Jun. 26, 2003

(65) Prior Publication Data
US 2004/0073429 A1 Apr. 15, 2004

(30) Foreign Application Priority Data
Dec. 17, 2001 (JP) .............................. 2001-383732

(51) Int. Cl.
*G10L 19/00* (2006.01)
*G10L 13/00* (2006.01)
*G10L 21/00* (2006.01)
(52) U.S. Cl. ...................... 704/201; 704/231; 704/258; 704/260; 704/272
(58) Field of Classification Search .................. 704/201, 704/231, 258, 260, 272; 381/77; 84/483.2; 178/2, 3
See application file for complete search history.

(56) References Cited

U.S. PATENT DOCUMENTS 4,731,847 A * 3/1988 Lybrook et al. ............. 704/260
(Continued)

FOREIGN PATENT DOCUMENTS

JP 2000-261560 A1 9/2000
(Continued)

OTHER PUBLICATIONS

International Search Report, Jan. 14, 2003.

*Primary Examiner*—Patrick N. Edouard
*Assistant Examiner*—Douglas C Godbold
(74) *Attorney, Agent, or Firm*—Rader Fishman & Grauer PLLC; Ronald P. Kananen

(57) ABSTRACT

The invention relates to an information transmission system capable of transmitting target information via voice, as well as to an information encoding apparatus and an information decoding apparatus for use with the system. The information encoding apparatus (31) converts input text information to an intermediate code in accordance with a predetermined encoding method, and outputs a voice derived from voice information based on the intermediate code and supplemented with music arrangement information. The voice is transmitted either directly or via a broadcasting or communicating medium to a receiving side. The information decoding apparatus (34) on the receiving side receives the generated voice, recognizes a voice waveform from the received voice, and reproduces the original target information by decoding the intermediate code based on the recognized voice waveform. During the encoding, the intermediate code is assigned to at least one element of the voice, and the music arrangement information is used as a basis for determining at least one other element of the voice. This provides the kind of voice agreeable to the human ear.

7 Claims, 16 Drawing Sheets

U.S. PATENT DOCUMENTS

| | | | |
|---|---|---|---|
| 5,540,589 A * | 7/1996 | Waters | 434/156 |
| 5,583,933 A * | 12/1996 | Mark | 379/357.04 |
| 5,642,470 A * | 6/1997 | Yamamoto et al. | 704/270 |
| 5,659,663 A * | 8/1997 | Lin | 704/258 |
| 5,895,449 A * | 4/1999 | Nakajima et al. | 704/278 |
| 5,915,237 A * | 6/1999 | Boss et al. | 704/270.1 |
| 5,966,690 A * | 10/1999 | Fujita et al. | 704/233 |
| 5,982,977 A * | 11/1999 | Naruse et al. | 386/64 |
| 6,140,568 A * | 10/2000 | Kohler | 84/616 |
| 6,424,944 B1 * | 7/2002 | Hikawa | 704/260 |
| 6,462,264 B1 * | 10/2002 | Elam | 84/645 |
| 6,689,946 B2 * | 2/2004 | Funaki | 84/478 |
| 6,947,893 B1 * | 9/2005 | Iwaki et al. | 704/258 |
| 7,013,277 B2 * | 3/2006 | Minamino et al. | 704/257 |
| 7,062,439 B2 * | 6/2006 | Brittan et al. | 704/260 |
| 2001/0027396 A1 * | 10/2001 | Sato | 704/260 |
| 2002/0057765 A1 * | 5/2002 | Hyziak et al. | 379/52 |
| 2002/0085685 A1 * | 7/2002 | Engelke et al. | 379/52 |

FOREIGN PATENT DOCUMENTS

| | | |
|---|---|---|
| JP | 2001-16349 A1 | 1/2001 |
| WO | WO 00/21203 A1 | 4/2001 |

* cited by examiner

CONVERSION TABLE BASED ON PITCH 72

| PITCH | FREQUENCY (Hz) | INTERMEDIATE CODE |
|---|---|---|
| N | REST | 000 |
| C | 261.63 | 001 |
| D | 293.66 | 010 |
| E | 329.63 | 011 |
| F | 349.23 | 100 |
| G | 392.00 | 101 |
| A | 440.00 | 110 |
| B | 493.88 | 111 |

FIG. 9A

CONVERSION TABLE BASED ON EQUAL LENGTH NOTES 73

| NOTES | INTERMEDIATE CODE |
|---|---|
| QUARTER NOTE × 1 (♩) | 00 |
| EIGHTH NOTE × 2 (♫) | 01 |
| DOTTED EIGHTH NOTE + SIXTEENTH NOTE (♫) | 10 |
| SIXTEENTH NOTE + DOTTED EIGHTH NOTE (♫) | 11 |

FIG. 9B

CONVERSION TABLE BASED ON UNEQUAL LENGTH NOTES 74

| NOTES | INTERMEDIATE CODE |
|---|---|
| REST (𝄽) | 1111 |
| QUARTER NOTE (♩) | 1110 |
| EIGHTH NOTE (♪) | 110 |
| SIXTEENTH NOTE (♬) | 10 |
| THIRTY-SECOND NOTE (♪) | 0 |

(a) TARGET TEXT INFORMATION: sony (b) ASCII CODE: 73 (0111 0011), 6F (0110 1111), 6E (0110 1110), 79 (0111 1001)

(c) INTERMEDIATE CODE OF NOTE LENGTH: 0, 1110, 0, 110, 110, 1111, 0, 110, 110, ...

(d)

(a) TARGET TEXT INFORMATION: sony (b) ASCII CODE: 73 (0111 0011), 6F (0110 1111), 6E (0110 1110), 79 (0111 1001)

(c) INTERMEDIATE CODE OF NOTE LENGTH: 01, 11, 00, 11, 01, 10, 11, 11, ...

(d)

FIG. 12A
CONVERSION TABLE BASED ON MELODIES
| MELODIES | INTERMEDIATE CODE |
|---|---|
| MELODY A | 00 |
| MELODY B | 01 |
| MELODY C | 10 |
| MELODY D | 11 |
—75
FIG. 12B
INTERMEDIATE CODE 00:A
FIG. 12C
INTERMEDIATE CODE 01:B
FIG. 12D
INTERMEDIATE CODE 10:C
FIG. 12E
INTERMEDIATE CODE 11:D (a) TARGET TEXT INFORMATION: sony (b) ASCII CODE: 73(0111 0011), 6F(0110 1111), 6E(0110 1110), 79(0111 1001)

(c) INTERMEDIATE CODE OF MELODIES: B(01), D(11), A(00), D(11), B(01), C(10), D(11), D(11), ...

CONVERSION TABLE BASED ON CHORDS  76

| CHORDS | | | INTERMEDIATE CODE |
|---|---|---|---|
| DO→C | (DO, MI, SO) | | 00 |
| RE→Dm | (RE, FA, LA) | | 01 |
| MI→Em | (MI, SO, TI) | | 10 |
| FA→F | (FA, LA, DO) | | 11 |
| SO→G7 | (SO, TI, RE) | (FA) | 00 |
| LA→Am | (LA, MI, DO) | | 01 |
| TI→Bm7-5 | (TI, DO, FA) | (LA, MI) | 10 |

FIG. 15

(a) TARGET TEXT INFORMATION: sony (b) ASCII CODE: 73 (0111 0011), 6F (0110 1111),
6E (0110 1110), 79 (0111 1001)

(c) INTERMEDIATE CODE OF CHORDS: 01, 11, 00, 11, 01, 10, ···

(d) Dm or Am, F, C or G7, F, Dm or Am, Em or Bm7-5, ···

CONVERSION TABLE BASED ON TONE COLORS

A TABLE OF TONE COLORS AND INTERMEDIATE CODES (EXAMPLES OF HUMMING AND WHISTLING) — 77

0:

1:

(a) TARGET TEXT INFORMATION: sony (b) ASCII CODE: 73 (0111 0011), 6F (0110 1111), 6E (0110 1110), 79 (0111 1001)

(c) INTERMEDIATE CODE: 0, 1, 1, 1, ⋯

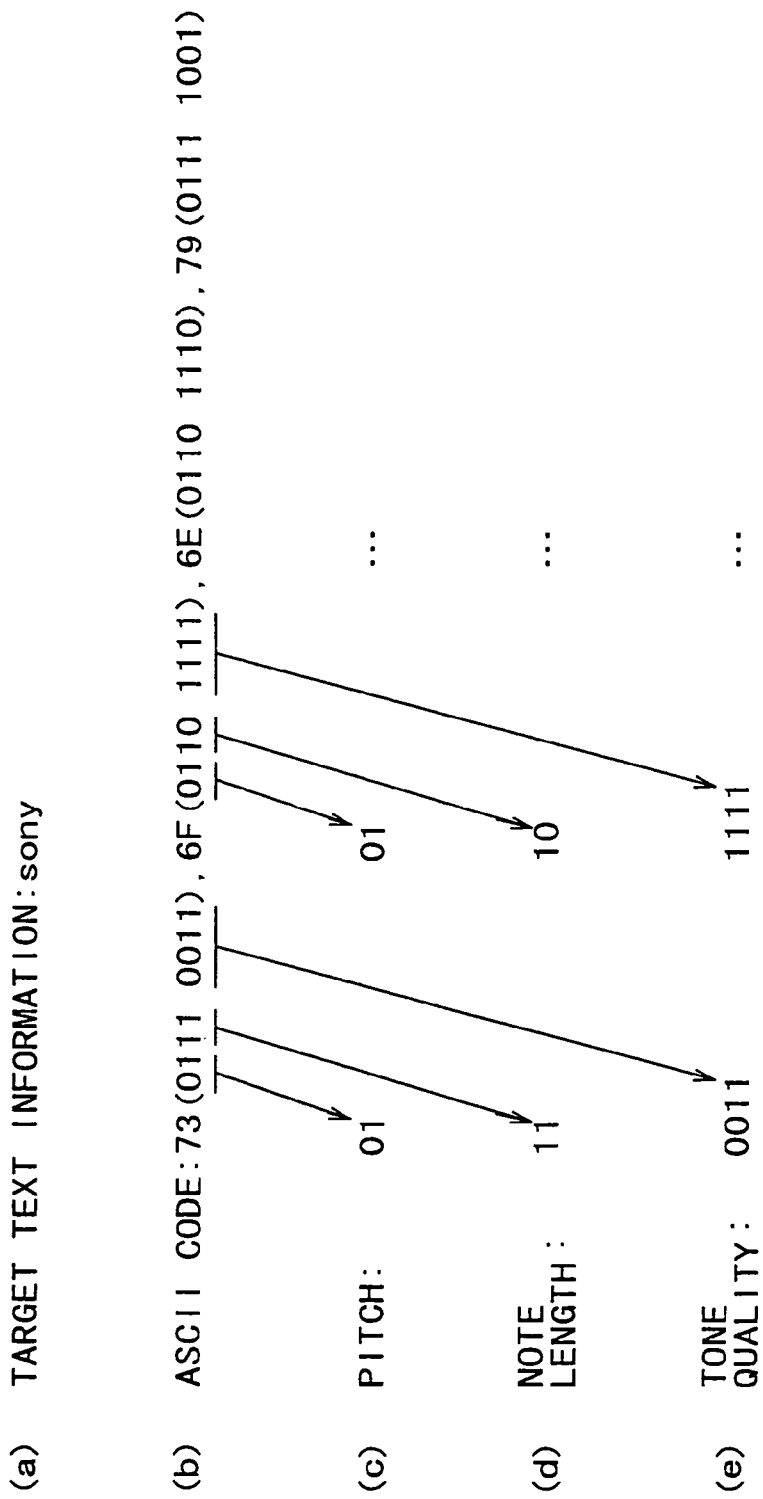

INFORMATION TRANSMITTING SYSTEM, INFORMATION ENCODER AND INFORMATION DECODER

TECHNICAL FIELD

The present invention relates to an information transmission system capable of transmitting target information via voice, as well as to an information encoding apparatus and an information decoding apparatus for use with the system.

BACKGROUND ART

A transmission apparatus of a conventional voice communication system typically uses microphones or the like to convert into an electrical signal speeches or sounds emitted by humans, musical instruments, or speakers and pieces of instrumental or synthesized music, before transmitting the electrical signal thus generated to remote locations. A reception apparatus of the system receives the transmitted electrical signal and reproduces the original sounds therefrom using speakers so that the reproduced sounds can be heard by humans. This type of voice communication system may also transmit text information. That is, text information is first vocalized by the sending side having the text read aloud by humans or synthesized by a voice synthesis apparatus for voice information transmission. On the receiving side, the received voice information is recognized as or converted to the original text information on a one-to-one correspondence basis.

FIG. 1 is a block diagram of a voice communication setup based on conventional voice recognition technology. In this setup, text information such as URL addresses is transmitted by voice as follows: text information is first input from an input unit 10 to a storage unit 11. A voice synthesis unit 12 converts the stored text information into a voice signal. At this point, the voice synthesis unit 12 turns the text into the close equivalent of a human voice. The synthesized voice signal is converted by a DAC circuit 13 into an analog waveform, which in turn is output as a voice waveform by a speaker 14 onto a communication channel 15 (space in this example). The voice waveform propagates through space to reach a microphone 16 on the receiving side. The voice waveform, picked up by the microphone 16, is converted to a digital signal by an ADC circuit 17. The digital signal is submitted to a voice recognition unit 18 for band-pass filtering and extraneous signal element removal before text-to-voice signal pattern matching for conversion to the original text information. The resulting text information is stored into a storage unit 19. This is how text information is typically transmitted by voice from one side to another.

In another setup involving voice modems, speeches are encoded and decoded for transmission using a speech bandwidth. This setup typically utilizes a closed voice-grade communication channel 15 such as a telephone line (wired). FIG. 2 is a block diagram of a voice communication setup based on a conventional voice modem arrangement.

In the setup of FIG. 2, text information is first input by an input unit 20 to a storage unit 21. The stored text information is converted by a data transmission unit 22 to a digital signal train that can be interpreted by a voice modem 23 based on character codes. The data transmission unit 22 outputs the digital signal train of 0s and 1s, which are not recognized as text by the voice modem 23. The voice modem 23 converts the input digital signal train into voice-grade signal waveforms. The signal waveforms thus generated are transmitted over a telephone line 25 through a modular jack 24 identical to that, which is used by the telephone for analog voice communication.

On the receiving side, the signal waveforms are received through the telephone line 25, i.e., a voice-grade communication channel, and input to a voice modem 27 via a modular jack 26. The voice modem 27 converts the signal waveforms to a digital signal using a demodulation method corresponding to the modulation method adopted by the voice modem 23 on the sending side. The digital signal is input to a data reception unit 28 whereby the digital signal data are recognized as text information. The resulting text information is stored using ASCII codes into a storage unit 29.

One disadvantage of the conventional voice-based information transmission system outlined above is a low recognition rate combined with a low processing speed in converting human speeches to voice information. Another disadvantage is a lack of privacy; what is desired to be transmitted can be overheard by a third party. If the content to be sent is encrypted, the resulting audio effect can be awkward and unpleasant to the human ear.

Furthermore, the encoding and decoding setup based on the conventional voice-grade communication arrangement, such as modems, has the disadvantage of the encoded voice being disagreeable to the human ear. That means the setup cannot be used where the encoded voice needs to be broadcast aloud to a large number of people.

The present invention has been made in view of the above circumstances and provides an information transmission apparatus as well as an information encoding apparatus and an information decoding apparatus for use with the system. The information encoding apparatus on a sending side converts target information to voice format for voice transmission to a receiving side through an I/O interface of conventional audio equipment, such as speakers and microphones, the information decoding apparatus on the receiving side reproduces the target information based on the voice information received.

DISCLOSURE OF INVENTION

In carrying out the invention and according to one aspect thereof, there is provided an information transmission system including: an information encoding apparatus which encodes target information into a voice signal in accordance with a predetermined encoding method and outputs the voice signal as a voice; and an information decoding apparatus which receives the voice generated by the information encoding apparatus, recognizes a voice waveform from the received voice, and reproduces the original target information from the recognized voice waveform.

According to another aspect of the invention, there is provided an information transmission system including: an information encoding apparatus which converts target information into an intermediate code in accordance with a predetermined encoding method, and outputs a voice derived from voice information based on the intermediate code and supplemented with music arrangement information; and an information decoding apparatus which receives the voice generated by the information encoding apparatus, recognizes a voice waveform from the received voice, and reproduces the original target information by decoding the intermediate code based on the recognized voice waveform.

As outlined above, where the information encoding apparatus of the invention is in use, target information, such as text information, is converted to a voice signal, which is then transmitted through a conventional voice propagating medium. Where the information decoding apparatus of the invention is in use, the original text information is reproduced from the voice signal. This makes it possible in particular for the existing audio mediam, such as the television, radio, telephones, tape recorders, and CDs, to propagate the information. When a conventional voice transmission system is in place, simply attaching the inventive encoding and decoding apparatuses to an I/O device of the system allows the system to transmit the information. These encoding and decoding apparatuses are relatively inexpensive to manufacture and thus can be used in a wide range of applications.

When the target information is converted to the voice signal by the inventive system, the resulting voice, which used to sound unpleasant passing through voice modems, is made more agreeable to the human ear like music. This feature enables the system to be utilized for indoor and outdoor paging applications using speakers.

Preferably, the target information may be constituted by text information that is converted to a character code, which in turn is converted to the intermediate code, the intermediate code being assigned to at least one element of the voice, and the music arrangement information being used as a basis for determining at least one other element of the voice. The voice elements may be at least any two of a pitch, a note length, a tone color, a tone quality, a melody, and a chord.

According to a further aspect of the invention, there is provided an information encoding apparatus including: a converting element for converting target information to an intermediate code in accordance with a predetermined encoding method; a voice waveform synthesis unit for synthesizing a voice waveform representing a voice derived from voice information based on the intermediate code and supplemented with music arrangement information; and a voice outputting element for audibly outputting the voice synthesized by the voice waveform synthesis unit.

Preferably, the target information may be constituted by text information that is converted to a character code, which in turn is converted to the intermediate code, the intermediate code being assigned to at least one element of the voice, the music arrangement information being used as a basis for determining at least one other element of the voice.

The intermediate code may preferably be assigned to a pitch, a note length, a tone color, a tone quality, a melody, or a chord. The voice elements that are not allotted to the intermediate code may be arranged as desired.

According to an even further aspect of the invention, there is provided an information decoding apparatus for use with an information encoding apparatus which converts target information to an intermediate code in accordance with a predetermined encoding method and generates a voice derived from voice information based on the intermediate code and supplemented with music arrangement information, the voice being decoded by the information decoding apparatus into the original target information, the information decoding apparatus including: a voice receiving element for receiving the voice; a voice waveform recognizing element for recognizing a voice waveform from the received voice; and an intermediate decoding element for decoding the intermediate code from the recognized voice waveform before reproducing the original target information based on the decoded intermediate code.

BRIEF DESCRIPTION OF DRAWINGS

FIGS. 9A and 9B are schematic views of conversion tables based on note lengths as intermediate codes;

FIGS. 12A through 12E are schematic views of a conversion table based on melodies as intermediate codes and related musical scores;

FIG. 14 is a schematic view of a conversion table based on chords.;

FIG. 15 is a schematic view of an encoding example in which the conversion table 76 of FIG. 14 is used for encoding;

FIG. 18 is a schematic view of an example in which intermediate codes are assigned to various voice elements.

BEST MODE FOR CARRYING OUT THE INVENTION

Preferred embodiments of this invention will now be described with reference to the accompanying drawings.

Figure 1:
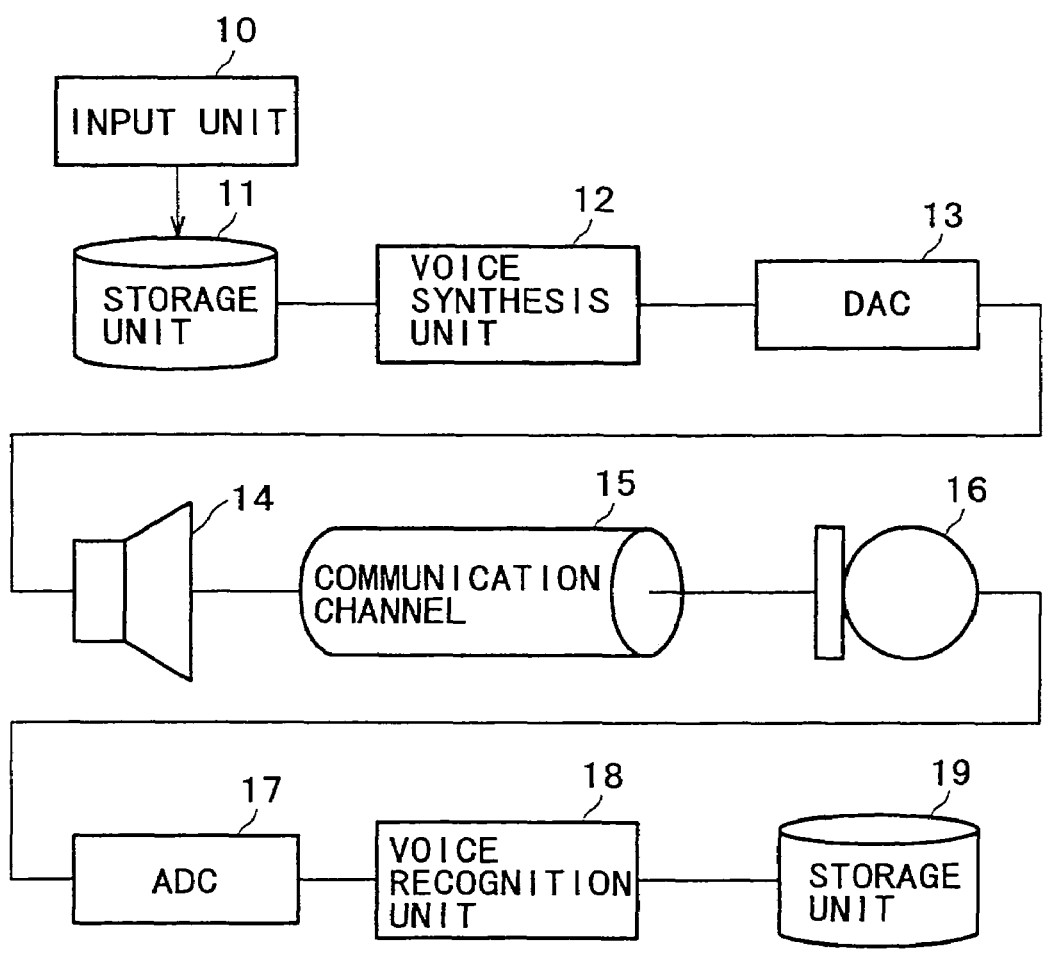
FIG. 1 is a block diagram of a voice communication setup based on conventional voice recognition technology.
Figure 2:
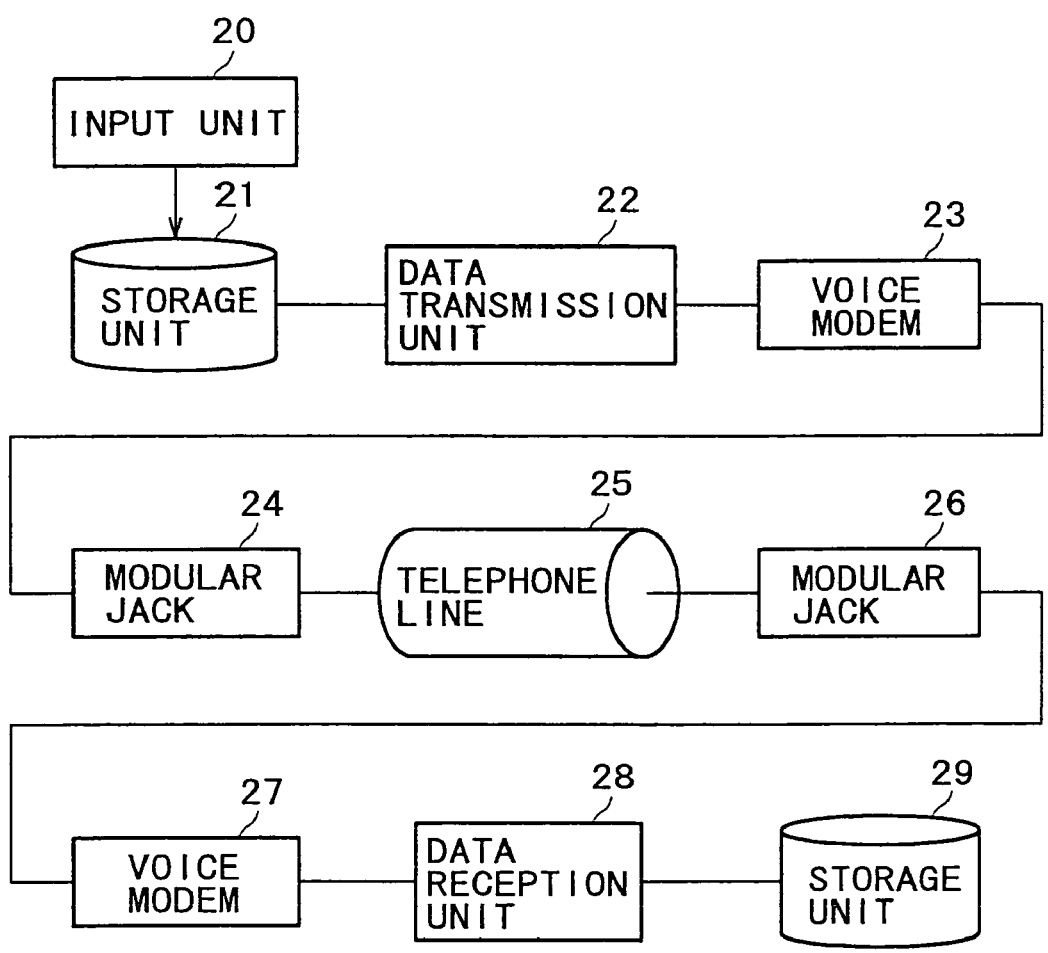
FIG. 2 is a block diagram of a voice communication setup based on a conventional voice modem arrangement.
Figure 3:
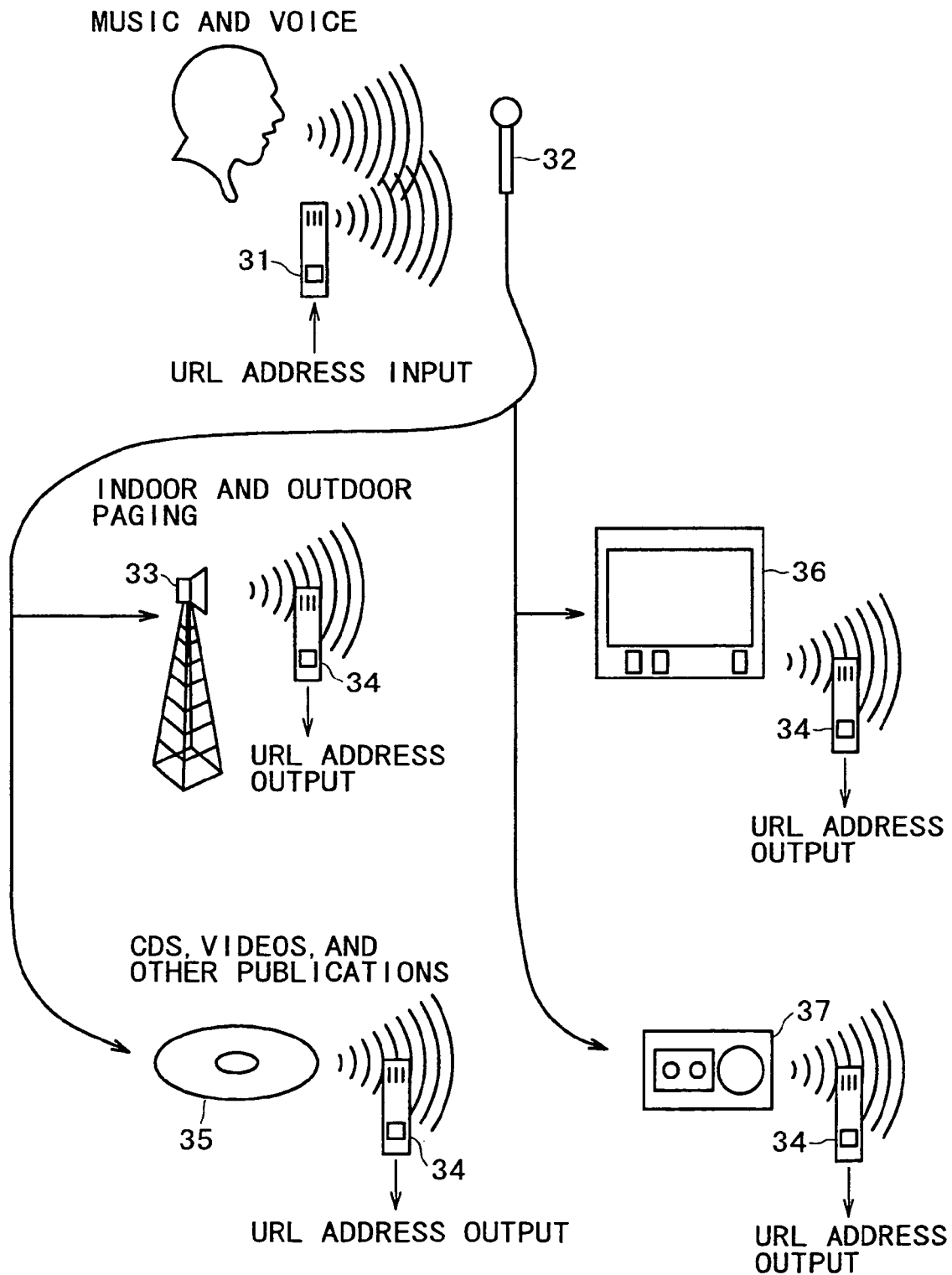
FIG. 3 is a schematic view conceptualizing an information transmission system according to this invention.

FIG. 3 is a schematic view conceptualizing an information transmission system of this invention.

According to the invention, existing communication and transmission media are utilized in transmitting audio signals, such as voice and music as well as target information, by means of audible voice propagated through the atmosphere. In this specification, the term "voice" refers to sounds on the speech or human auditory bandwidth, handled by existing analog and digital audio equipment addressing audio range frequencies; and "target information" refers typically to text information, either meaningful in itself or serving as a basis for acquiring other information. The latter case typically applies to text information such as URL (Universal Resource Locator) and e-mail addresses for designating specific destinations to be accessed with IT (Information Technology) equipment. When such text information is transmitted as a voice signal, an information decoding apparatus receiving the voice signal allows suitable IT equipment to acquire the text information from the signal without human intervention. This significantly enhances the operability of the IT equipment. The IT equipment envisaged by this invention includes, but is not limited to, portable data processing devices such as mobile telephones, personal data assistants (PDA), e-mail terminals, and small-sized personal computers.

On the transmitting side, the user first inputs a target code to be sent, such as a text string, to an information encoding apparatus 31. In the example of FIG. 3, a URL address is shown to be entered. The information encoding apparatus 31 encodes the input code in accordance with a predetermined encoding method and transmits what is encoded as an encoded voice. Examples of the encoding method will be discussed later. The encoded voice generated by the information encoding apparatus 31 is on the speech bandwidth. As such, the encoded voice can be transmitted by use of a microphone 32 designed to pick up human voice or music. The encoded voice may be inserted into intervals between human speeches or passages of music. Although the encoded voice should preferably be separated temporally from the human speeches or passages of music, this is not mandatory; they can be multiplexed into a superimposed signal depending on how redundant the voice is allowed to be when encoded. The encoded voice may later be extracted from the superimposed signal.

A signal waveform sent from the microphone 32 travels through a number of communicating, propagating, and storing media before being reproduced in the same manner as regular audio signals. The reproduction is carried out by diverse existing voice outputting means such as an indoor or outdoor speaker 33, a TV set, a radio receiver, a speaker of a telephone 36, a reproducing apparatus 35 of CDs, DVDs, or other storage medium (publications); or an audio/video recording/reproducing apparatus 37. The voice is output as an audible sound formed by vibrations of the atmosphere. The audible sound is received by an information decoding apparatus 34, whereby the original URL is reproduced.

Illustratively, a URL address may be encoded using a voice, and the encoded voice may be broadcast through an indoor or outdoor paging system on specific occasions to let a large number of people receive it. Each receiving party in possession of the information decoding apparatus 34 or a device incorporating it may have the encoded voice received and decoded by the apparatus to verify the URL address. In such a case, the information decoding apparatus 34 forwards the decoded URL address to a device that may utilize the address in procuring various services, such as a voice-based electronic information offering service. For example, URL addresses may be broadcast in the manner described to let spectators in a ballpark get information about baseball players or to let visitors at a museum obtain information about what is on display. Although it is possible in the ballpark to broadcast the encoded voice over the speech bandwidth, that may not be allowed in the museum or other locations where keeping quiet is appreciated. In the latter case, the encoded voice may be broadcast in an inaudible range slightly off the speech bandwidth so as not to let people become aware of the voice transmission.

If the voice signal is not directly broadcast by indoor or outdoor paging systems but received instead by equipment such as TV sets, radio receivers, or telephones capable of communicating with human voice, the communication process can be implemented as long as the voice signal is issued using the speech bandwidth.

Figure 4:
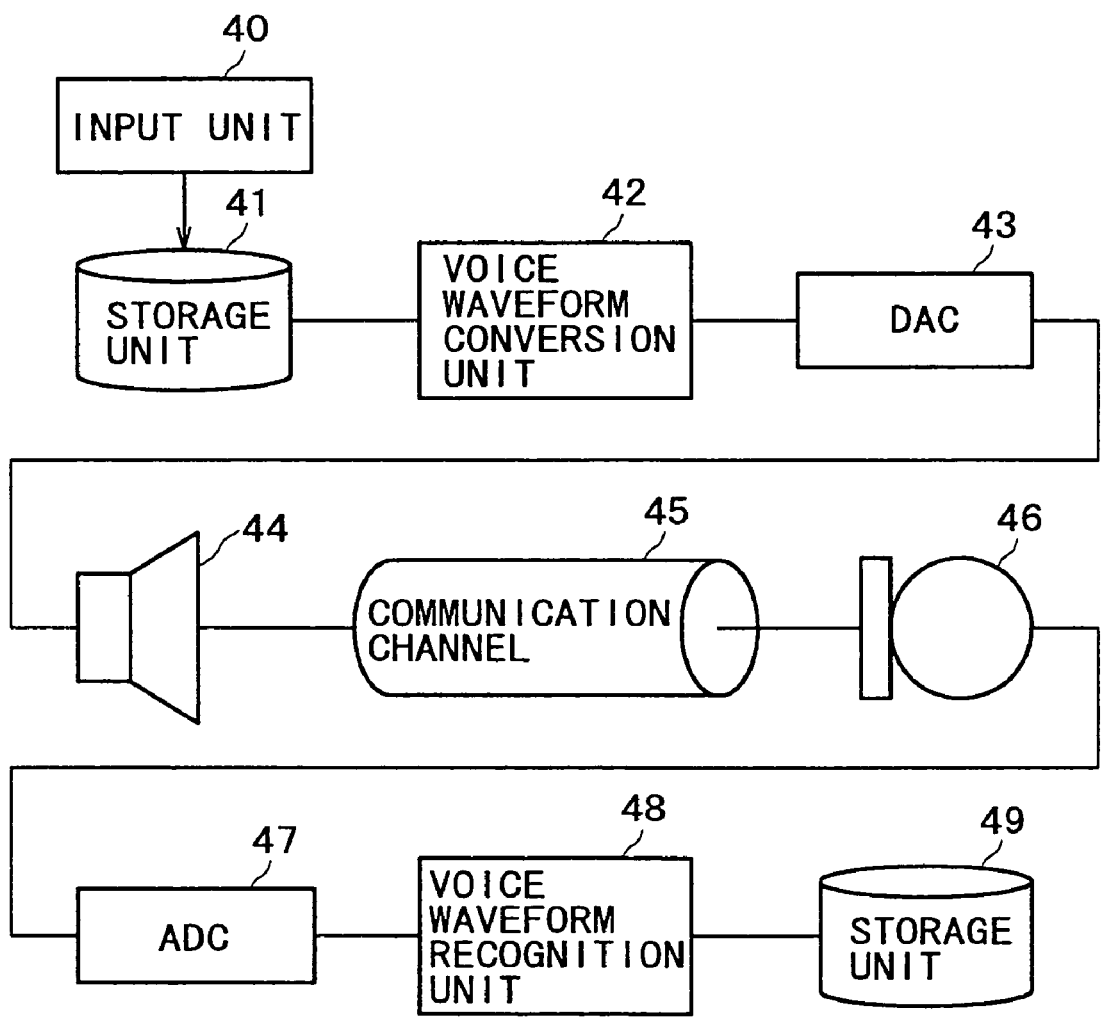
FIG. 4 is a block diagram outlining a typical configuration of an information transmission system embodying the invention.

FIG. 4 is a block diagram outlining a typical configuration of an information transmission system embodying the invention. The overall configuration of the system will now be described.

Target text information such as URLs is entered by the user through an input unit 40. The input text information is stored into a storage unit 41 (memory) for the moment. A voice waveform conversion unit 42 converts (encodes) the text information into a voice signal that can later be decoded on the receiving side. The voice waveform conversion unit 42 may be constituted by a processor such as a CPU or a DSP. If the voice signal is to be sent along with any other voice, the voice waveform conversion unit 42 switches the two over time or multiplexes them for transmission (this also applies to the other embodiments to be described later). The encoded signal is generally in digital form and needs to be converted to an analog waveform by a Digital-to-Analog Conversion (DAC) circuit 43. The resulting analog signal is generally output together with other sounds by a speaker into the atmosphere or onto a communication channel 45 for voice waveform propagation. The input unit 40, voice waveform conversion unit 42, DAC circuit 43, and speaker 44 constitute an information encoding apparatus.

On the receiving side, a microphone 46 converts the received voice waveform to an electrical signal, which in turn is converted to a digital waveform by an Analog-to-Digital Conversion (ADC) circuit 47. The resulting digital waveform is input to a voice waveform recognition unit 48. The voice waveform recognition unit 48 recognizes the voice waveform and converts (decodes) the recognized voice waveform back to the original text information in reverse order to how the information was converted (encoded) on the transmitting side. Where the voice signal is received along with any other voice, the voice waveform recognition unit 48 switches or separates the two over time or extracts the target voice from the received signal (this also applies to the other embodiments to be described later). The microphone 46, ADC circuit 47, voice waveform recognition unit 48, and storage unit 49 constitute an information decoding apparatus.

Figure 5:
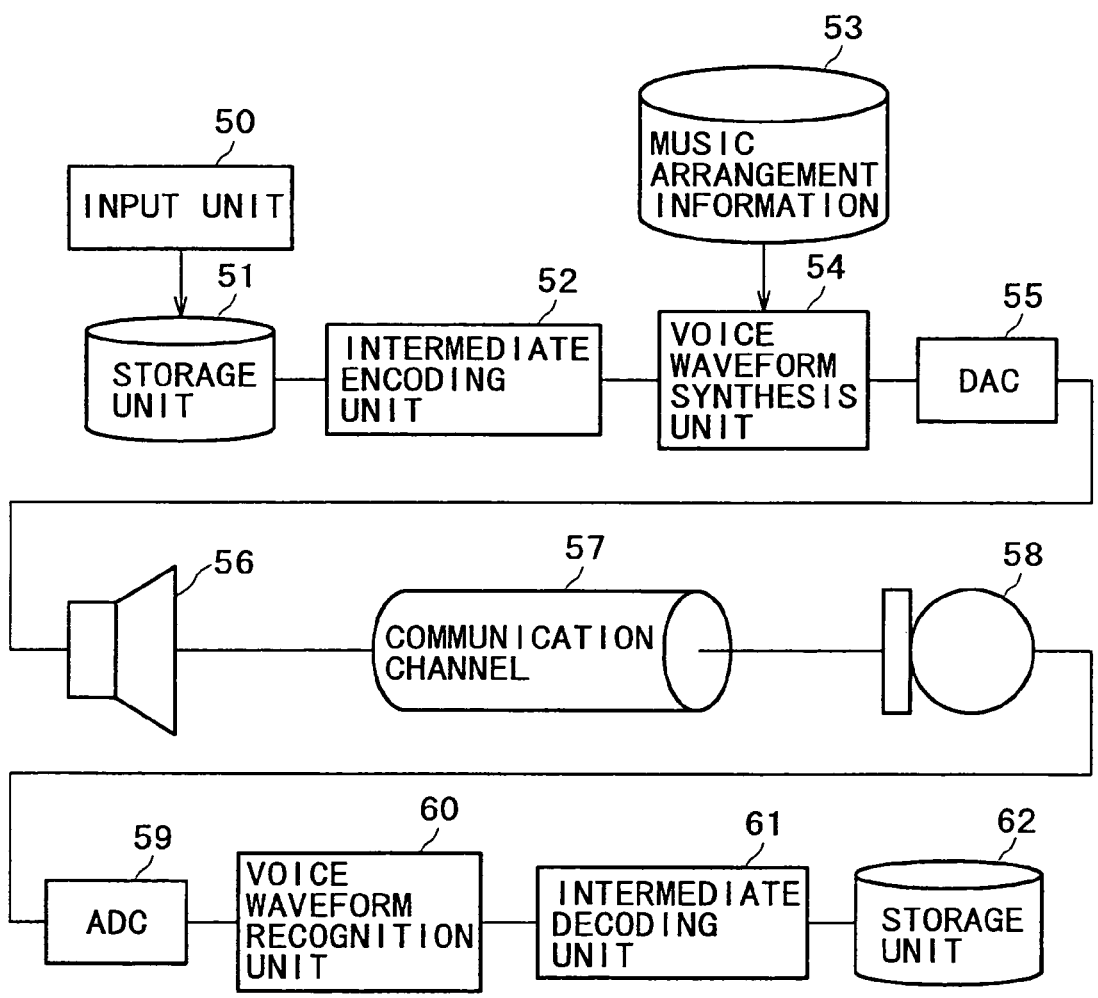
FIG. 5 is a block diagram showing a typical configuration of an information transmission system embodying the invention by use of intermediate codes.

FIG. 5 is a block diagram showing a typical configuration of an information transmission system embodying the invention by use of intermediate codes. Text information, such as URLs, is first input through an input unit 50 and stored into a storage unit 51. An intermediate encoding unit 52 converts the stored text information to intermediate codes serving as identification codes representing the text information. A voice waveform synthesis unit 54 downstream of the intermediate encoding unit 52 synthesizes a voice waveform signal by supplementing the voice information based on the intermediate codes with music arrangement information 53. Illustratively, if the intermediate codes represent pitch (i.e., the highs and lows of notes), then the music arrangement information can be of note lengths or tone colors; if the intermediate codes represent note lengths, then melodies, pitch, and tone colors may be arranged as desired. In the arrangement, part of an existing piece of music may be changed in certain voice elements so as to embed text information within the music. The waveform signal from the voice waveform synthesis unit 54 is converted by a DAC 55 to an analog waveform, which in turn is output from a speaker 56. The input unit 50, intermediate encoding unit 52, music arrangement information 53, voice waveform synthesis unit 54, DAC 55, and speaker 56 constitute an information encoding apparatus.

The voice is propagated through a communication channel 57 (e.g., the atmosphere or conventional paging or communication systems) to the receiving side. On the receiving side, a microphone 58 picks up and converts the voice waveform to an electrical signal, which in turn is converted to a digital waveform by an ADC circuit 59. The resulting digital waveform is input to a voice waveform recognition unit 60. The recognition unit 60 recognizes the voice, removes any music arrangement information from the voice, and extracts the intermediate codes from the voice in reverse order to how the codes were embedded on the transmitting side. An intermediate decoding unit 61 downstream of the voice waveform recognition unit 60 decodes the received information back to the original text information using the same conversion method adopted by the transmitting side for encoding the target information into the intermediate codes. The text information is stored into a storage unit 62. The microphone 58, ADC circuit 59, voice waveform recognition unit 60, intermediate decoding unit 61, and storage unit 62 constitute an information decoding apparatus.

Figure 6:
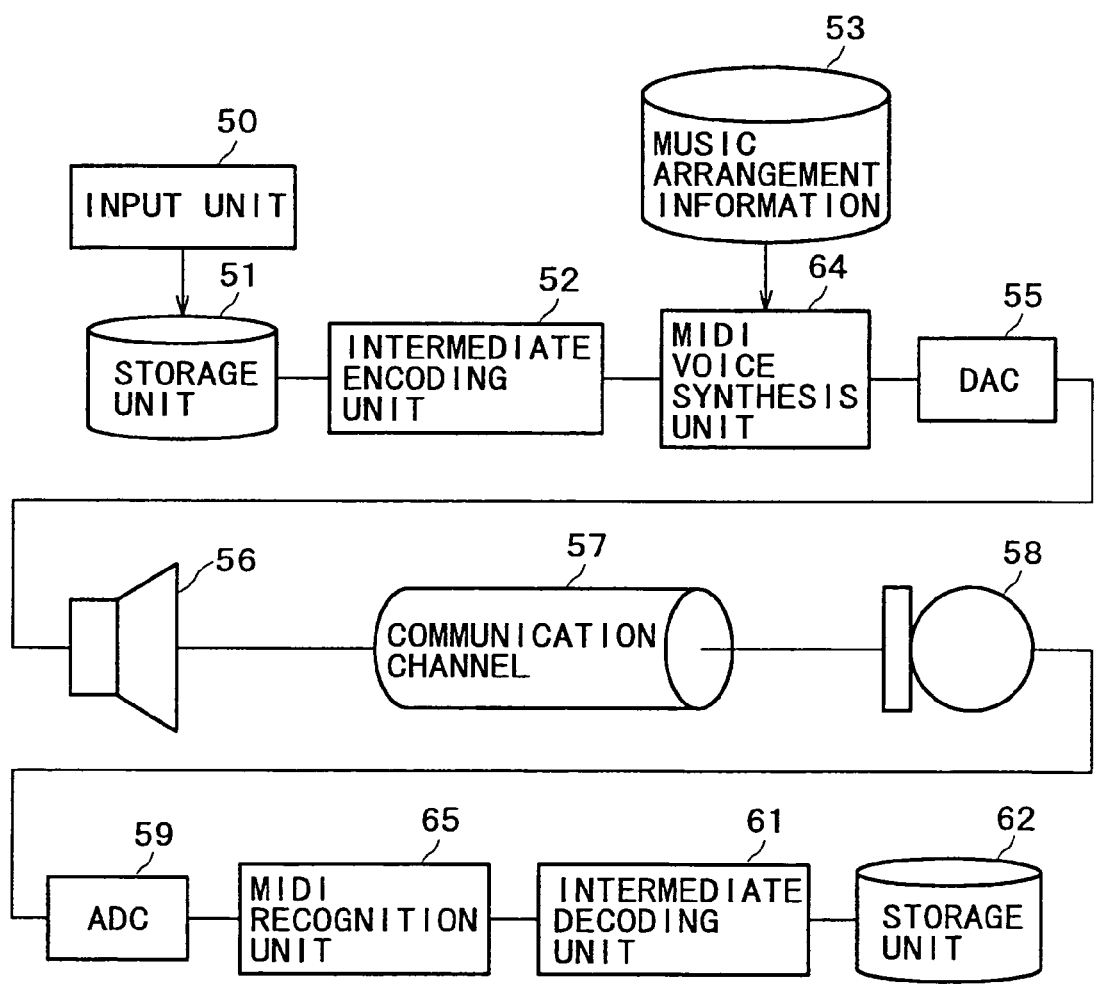
FIG. 6 is a block diagram of an information transmission system embodying the invention by use of a MIDI arrangement.

FIG. 6 is a block diagram of an information transmission system embodying the invention by use of a MIDI (Musical Instrument Digital Interface) arrangement. When the intermediate codes discussed with reference to FIG. 5 are made to correspond with parameters in the MIDI format, it is possible to utilize a MIDI voice synthesis unit 64 and a MIDI recognition unit 65, which are easier to use and more versatile in their applications. The other components are the same as those in the configuration of FIG. 5. More specifically, a MIDI signal is made up of such parameters as pitch, volume, note length, and tone color. Some of these parameters may correspond to, and thus defined by, the intermediate codes; the remaining parameters are allowed to be arranged as desired using the music arrangement information 53.

Some encoding examples using intermediate codes are discussed below.

Figures 7A, 7B:
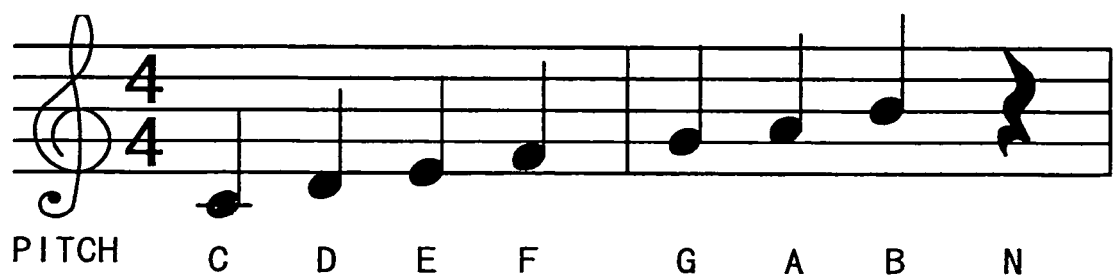
FIGS. 7A and 7B are explanatory views of an encoding method using pitch as intermediate codes.

FIGS. 7A and 7B are explanatory views of an encoding method using pitch as intermediate codes. FIG. 7A shows a conversion table 72 based on pitch as intermediate codes, and FIG. 7B indicates a musical score representing what is shown in the conversion table 72. The table and the score show seven tones of an octave (i.e., C, D, E, F, G, A, and B) and a rest (N) represented by eight different codes (in three-bit binary notation ranging from "000" to "111" in this example).

Figure 8:
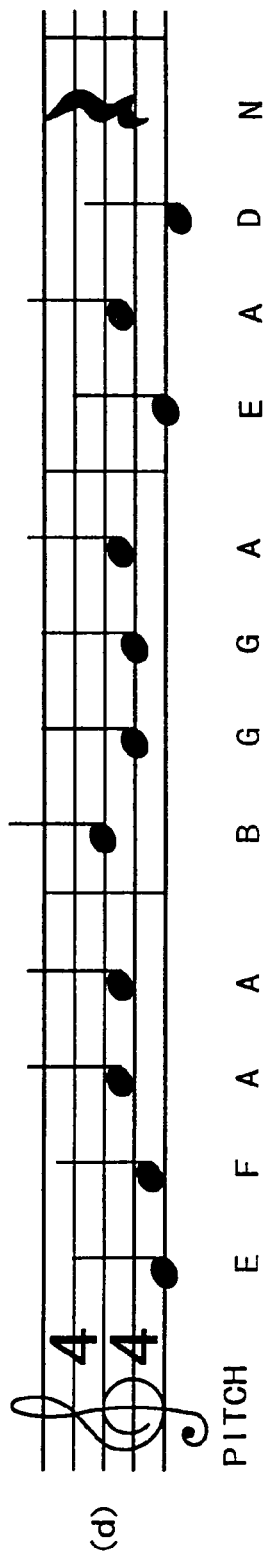
FIG. 8 is a schematic view of an encoding example in which the intermediate codes of FIGS. 7A and 7B are used for encoding.

FIG. 8 is a schematic view of an encoding example in which the above-mentioned intermediate codes are used for encoding. FIG. 8(a) indicates four alphabetic characters "s," "o, " "n," and "y" as an example of target text information to be transmitted; any number of alphanumeric characters and/or symbols may be employed as target text information. In this example, the target text information is first converted to ASCII codes (each character defined by an eight-bit binary number) as shown in FIG. 8(b) and then to intermediate codes, as indicated in FIG. 8(c). More specifically, the ASCII codes are laid out as binary numbers, which are delimited into three-bit units, each of which is assigned to an intermediate code representing pitch. FIG. 8(d) shows a musical score giving the resulting notes. Although this example assumes the notes to be constant in length (e.g., quarter note each), this is not limitative of the invention. Since the degrees of pitch need only be designated to denote the text information, the note lengths can be determined as desired (i.e., not limited to quarter notes as shown). This also applies to the other voice elements.

Whereas the intermediate codes in FIGS. 7A and 7B are shown assigned to pitch, they may alternatively be allotted to note lengths. FIG. 9A indicates a conversion table 73 based on equal length notes as intermediate codes. In this example, two-bit binary numbers are used as intermediate codes. The four codes, "00," "01," "10", and "11," are allotted to combinations of different notes each. The total length of the different notes in each of the combinations is the same (i.e., forming an equal length note). FIG. 9B indicates a conversion table 74 based on unequal length notes as intermediate codes. In this example, the intermediate codes are variable-length binary numbers. Each of the intermediate codes is allotted to a single note of a different length.

Figure 10:
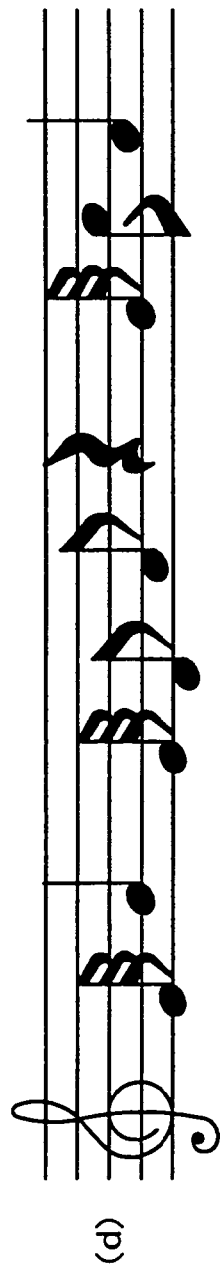
FIG. 10 is a schematic view of an encoding example in which the conversion table 73 of FIG. 9A is used for encoding.

FIG. 10 is a schematic view of an encoding example in which the conversion table 73 of FIG. 9A is used for encoding. FIGS. 10(a) and 10(b) indicate the same target text information and its ASCII code representation as those described above. FIG. 10(c) shows a row of intermediate codes representing the note lengths found in the conversion table 73 of FIG. 9A. FIG. 10(d) depicts a musical score giving the notes corresponding to the row of the intermediate codes. In this example, the intermediate codes define only the note lengths; the pitch is determined arbitrarily. The other voice elements may be defined or arranged as desired.

Figure 11:
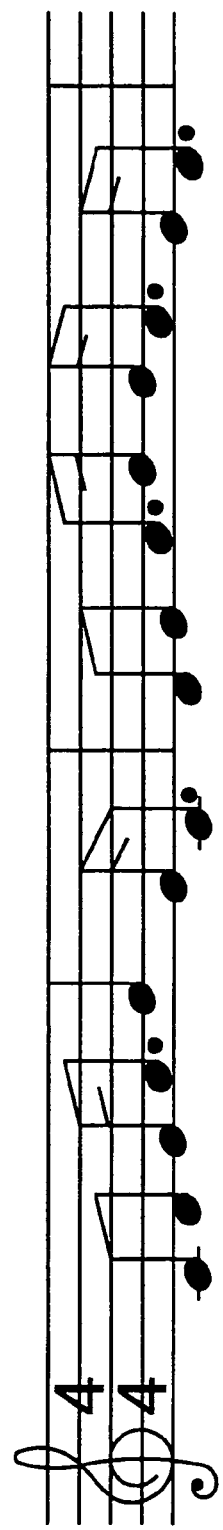
FIG. 11 is a schematic view of an encoding example in which the conversion table 74 of FIG. 9B is used for encoding.

FIG. 11 is a schematic view of an encoding example in which the conversion table 74 of FIG. 9B is used for encoding. FIGS. 11(a) and 11(b) denote the same target text information and its ASCII code representation as those described above. FIG. 11(c) shows a row of intermediate codes representing the note lengths found in the conversion table 74 of FIG. 9B. FIG. 11(d) depicts a musical score showing the notes corresponding to the row of the intermediate codes. In this example, too, the intermediate codes define only the note lengths; the pitch is determined arbitrarily. The other voice elements may be defined or arranged as desired.

FIG. 12A shows a conversion table 75 based on melodies. In the conversion table 75, different melodies (phrases) A, B, C, and D are assigned to two-bit binary intermediate codes. FIGS. 12B through 12E show the scores of the melodies A, B, C, and D respectively. Where the melodies are allotted to the intermediate codes, music arrangement information is not needed; tone quality, volume, and other voice elements may be arranged as desired.

Figure 13:
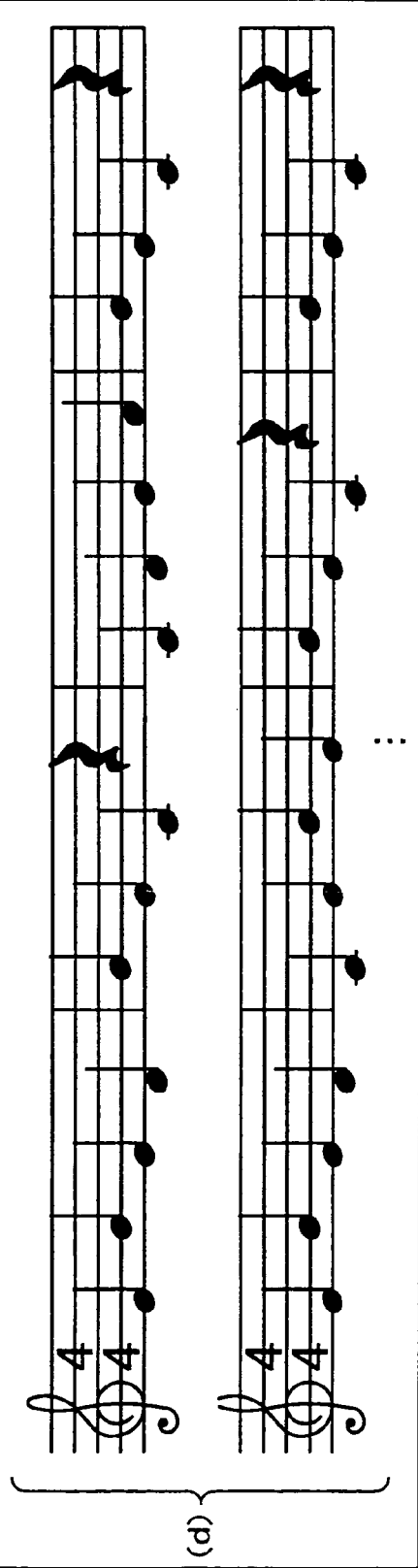
FIG. 13 is a schematic view of an encoding example in which the conversion table 75 of FIGS. 12A through 12E is used for encoding.

FIG. 13 is a schematic view of an encoding example in which the conversion table 75 of FIG. 12A is used for encoding. FIGS. 13(a) and 13(b) denote the same target text information and its ASCII code representation as those described above. FIG. 13(c) shows a row of intermediate codes representing the melodies found in the conversion table 75 of FIG. 12A. FIG. 13(d) depicts a musical score showing the notes corresponding to the row of the intermediate codes.

FIG. 14 shows a conversion table 76 based on chords. The conversion table 76 assigns different chords to each intermediate code each (a two-bit binary number). In this example, the same intermediate code is made to correspond with two different chords, such as an intermediate code "00" corresponding to chords C and G7. This gives a degree of redundancy to the kinds of chords that may be used. That in turn increases the degree of freedom in arranging the voice, making it possible to encode more harmonious chord progressions in musical terms. Although music arrangement information is not needed where the chords are assigned to the intermediate codes, it is still possible to arrange tone quality, volume, and other voice elements, as desired.

FIG. 15 is a schematic view of an encoding example in which the conversion table 76 of FIG. 14 is used for encoding. FIGS. 15(a) and (b) denote the same target text information and its ASCII code representation as those described above. FIG. 15(c) shows a row of intermediate codes representing the chords found in the conversion table 76 of FIG. 14. FIG. 15(d) indicates typical chords corresponding to the row of the intermediate codes.

Figures 16, 17:
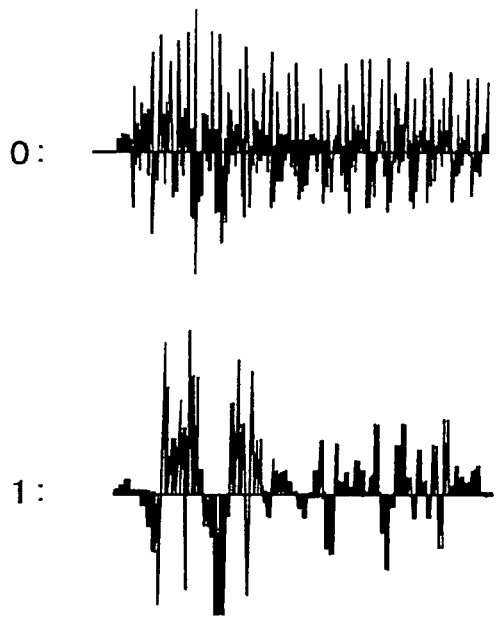
FIG. 16 is a schematic view of a conversion table based on tone colors.
FIG. 17 is a schematic view of an encoding example in which the conversion table 77 of FIG. 16 is used for encoding.

FIG. 16 shows a conversion table 77 based on tone colors. The conversion table 77 assigns different tone colors to intermediate codes (a one-bit binary number each). In this example, bit 0 is made to correspond with an oscillation waveform of humming, and bit 1 is made to correspond with an oscillation waveform of whistling. Where the number of tone colors used is greater, the number of bits in the intermediate code assigned to each tone color may be increased as well. Illustratively, if four tone colors are in use, then the intermediate codes may be of two bits each. When the tone colors are allotted to the intermediate codes, the other voice elements may be defined arbitrarily as part of the music arrangement information.

FIG. 17 is a schematic view of an encoding example in which the conversion table 77 of FIG. 16 is used for encoding. FIGS. 17(*a*) and 17(*b*) denote the same target text information and its ASCII code representation as those described above. FIG. 17(*c*) shows a row of intermediate codes representing the tone colors found in the conversion table 77 of FIG. 16. No illustration will be made of the row of the tone colors corresponding to the row of the intermediate codes.

Whereas the intermediate codes have been shown allotted to each of the diverse voice elements in the above examples, it is also possible to combine these elements as they are assigned to the intermediate codes. FIG. 18 shows one such example. FIGS. 18(*a*) and 18(*b*) denote the same target text information and its ASCII code representation as those described above. In this example, of eight bits constituting each ASCII code, the highest-order two bits are assigned to pitch, the next-highest-order two bits are assigned to a note length, and the low-order four bits to a tone quality. The tone quality, related to a tone color, is assumed here to be a different quality of sound emitted illustratively by a different musical instrument. The combinations of four bits can represent up to 256 different tone qualities. Illustratively, where one character is used to represent a tone in the example of FIG. 18, the pitch, length, and quality of that tone are determined but its volume is left freely adjustable. If a higher degree of redundancy is afforded to the content of an element allotted to a single intermediate code, a correspondingly higher degree of freedom is made available. In the example of FIG. 18, the highest-order two bits in each ASCII code may be selectively assigned a plurality of degrees of pitch (e.g., C and G allotted to "00"); the low-order four bits in each code may be selectively assigned tone qualities of different musical instruments (e.g., the piano and the flute assigned to "0011").

Although it is not necessary in any of the inventive encoding examples described above to generate the voice signal containing text information from a silent state, these setups may prefix a character code not regularly used as a character (e.g., "11111111") to a target character string in order to indicate the beginning of the text information to be generated as a voice. The embodiments may also suffix another character code not regularly used to the end of the character string so as to indicate its end. Alternatively, the beginning or the end of a character string may be designated not by any character code but by a predetermined brief note of an unused frequency. That note is recognized by the decoding apparatus using suitably added means. It is preferred to synchronize beforehand the transmitting and receiving speeds between the transmitting and the receiving sides.

Although the description above contains many specificities, these should not be construed as limiting the scope of the invention but as merely providing illustrations of some of the presently preferred embodiments of this invention. Thus, it is to be understood that changes and variations may be made without departing from the spirit or scope of the claims that follow. For example, whereas ASCII codes have been shown to be used in converting text information to intermediate codes in the above description, other suitable character codes may be adopted instead. Although no example was shown in which tone quality alone would be assigned to intermediate codes, such assignment can also be implemented if desired. With regard to quantitative voice elements such as pitch, intermediate codes may be assigned not to the notes themselves but to information about differences between the adjacent notes.

INDUSTRIAL APPLICABILITY

As described, the information transmission system according to the invention includes an information encoding apparatus and an information decoding apparatus. The encoding apparatus converts target information to be transmitted into voice, and the decoding apparatus reproduces the original target information from the voice received. The inventive system makes it possible for existing audio equipment with its voice-compatible I/O interface (e.g., speakers and microphones) to transmit the target information as encoded voice. That voice may be transmitted along with other sound signals.

Because target information to be sent is converted to voice for propagation, the transmission of the information is readily accomplished using conventional audio media, such as the radio and television.

The voice carrying the target information may be broadcast through indoor or outdoor paging setups covering extensive areas.

In any case, a specific voice element or elements are utilized in encoding the target information so that the other elements may be left for desired musical arrangement. This makes it possible for the encoded voice, when transmitted, to sound more agreeable to the human ear than before.

Where the information decoding apparatus of this invention is combined with IT equipment, the operability of the latter can be enhanced.

The invention claimed is:

1. An information decoding apparatus for use with an information encoding apparatus which converts target text information to an intermediate code in accordance with a predetermined encoding method and generates a voice signal derived from voice information based on said intermediate code and supplemented with music arrangement information, said intermediate code determining a first audible element of said voice signal, said music arrangement information determining a second audible element of said voice signal, said voice signal being decoded by said information decoding apparatus into the original target text information, said information decoding apparatus comprising:

voice receiving means for receiving said voice signal;

voice waveform recognizing means for recognizing a voice waveform from the received voice signal; and intermediate decoding means for decoding said intermediate code from the recognized voice waveform before reproducing the original target text information based on the decoded intermediate code, wherein said predetermined encoding method is according to a combination of at least two distinct sound elements that each respectively are components of said predetermined encoding method, wherein said combination of at least two distinct sound elements forms said first audible element of said voice signal, and wherein said combination comprises at least any two of a pitch, a note length, a tone color, a melody, and a chord.

2. An information transmission system comprising:

an information encoding apparatus adapted to transmit a voice waveform signal, said information encoding apparatus including an intermediate encoding unit and a voice waveform synthesis unit, said intermediate encoding unit converting text information to intermediate codes in accordance with a predetermined encoding method, said voice waveform synthesis unit supplementing voice information based on the intermediate codes with music arrangement information to synthesize said voice waveform signal, said intermediate codes determining a first audible element of said voice waveform signal, said music arrangement information determining a second audible element of said voice waveform signal; and an information decoding apparatus adapted to receive said voice waveform signal, said information decoding apparatus including a voice waveform recognition unit, said voice waveform recognition unit separating said voice information from said music arrangement information, extracting said intermediate codes from said voice information, and decoding said intermediate codes back to said text information, wherein said predetermined encoding method is according to a combination of at least two distinct sound elements that each respectively are components of said predetermined encoding method, wherein said combination of at least two distinct sound elements forms said first audible element of said voice signal, and wherein said combination comprises at least any two of a pitch, a note length, a tone color, a melody, and a chord.

3. An information transmission system according to claim 2, wherein said intermediate codes serve as identification codes representing said text information.

4. An information transmission system according to claim 2, wherein said text information is a URL.

5. An information decoding apparatus according to claim 1, wherein said text information is a URL.

6. An information encoding apparatus adapted to support transmission of a voice waveform signal to an information decoding apparatus, said information decoding apparatus being adapted to receive said voice waveform signal, separate voice information from music arrangement information, extract intermediate codes from said voice information, and decode said intermediate codes to text information, the information encoding apparatus comprising:

an intermediate encoding unit for converting said text information to said intermediate codes in accordance with a predetermined encoding method; and a voice waveform synthesis unit for supplementing voice information based on said intermediate codes with music arrangement information to synthesize said voice waveform signal, said intermediate codes determining a first audible element of said voice waveform signal, said music arrangement information determining a second audible element of said voice waveform signal, wherein said predetermined encoding method is according to a combination of at least two distinct sound elements that each respectively are components of said predetermined encoding method, wherein said combination of at least two distinct sound elements forms said first audible element of said voice signal, and wherein said combination comprises at least any two of a pitch, a note length, a tone color, a melody, and a chord.

7. An information encoding method for producing a voice waveform signal for transmission to an information decoding apparatus, said information decoding apparatus being adapted to receive said voice waveform signal, separate voice information from music arrangement information, extract intermediate codes from said voice information, and decode said intermediate codes to text information, the information encoding method comprising:

converting said text information to said intermediate codes in accordance with a predetermined encoding scheme; and supplementing voice information based on said intermediate codes with music arrangement information to synthesize said voice waveform signal, said intermediate codes determining a first audible element of said voice waveform signal, said music arrangement information determining a second audible element of said voice waveform signal, wherein said predetermined encoding scheme is according to a combination of at least two distinct sound elements that each respectively are components of said predetermined encoding method, wherein said combination of at least two distinct sound elements forms said first audible element of said voice signal, and wherein said combination comprises at least any two of a pitch, a note length, a tone color, a melody, and a chord.

* * * * *

UNITED STATES PATENT AND TRADEMARK OFFICE
CERTIFICATE OF CORRECTION

| | |
|---|---|
| PATENT NO. | : 7,415,407 B2 |
| APPLICATION NO. | : 10/468106 |
| DATED | : August 19, 2008 |
| INVENTOR(S) | : Tetsuya Naruse |

Page 1 of 1

It is certified that error appears in the above-identified patent and that said Letters Patent is hereby corrected as shown below:

Title Page and Col. 1:
Item (54) should read:
-- INFORMATION TRANSMISSION SYSTEM, INFORMATION ENCODING APPARATUS, AND INFORMATION DECODING APPARATUS --.

Signed and Sealed this

Twenty-fifth Day of November, 2008

JON W. DUDAS
*Director of the United States Patent and Trademark Office*